United States Patent [19]

Gülck

[11] Patent Number: 4,661,855

[45] Date of Patent: Apr. 28, 1987

[54] TELEVISION CAMERA WITH A DEVICE FOR VARYING ITS VIEWING DIRECTION

[75] Inventor: Erich Gülck, Kiel, Fed. Rep. of Germany

[73] Assignee: IBAK, Helmut Hunger GmbH & Co., KG, Kiel, Fed. Rep. of Germany

[21] Appl. No.: 820,401

[22] Filed: Jan. 17, 1986

[30] Foreign Application Priority Data

Oct. 12, 1985 [DE] Fed. Rep. of Germany ....... 3536435

[51] Int. Cl.⁴ .......................... H04N 7/18; G02B 13/16
[52] U.S. Cl. .................................... 358/225; 358/229
[58] Field of Search ............. 358/229, 225, 210, 108; 354/481, 94–99

[56] References Cited

U.S. PATENT DOCUMENTS

| | | | |
|---|---|---|---|
| 3,166,623 | 1/1965 | Waidelich, Jr. .................... | 358/225 |
| 3,706,848 | 12/1972 | Rouet ................................. | 358/225 |
| 3,958,080 | 5/1976 | Schadler ............................. | 358/229 |
| 4,024,573 | 5/1977 | Carnes ................................ | 358/225 |
| 4,229,762 | 10/1980 | Healy .................................. | 358/225 |

*Primary Examiner*—Gene Z. Rubinson
*Assistant Examiner*—Stephen Brinich
*Attorney, Agent, or Firm*—Herbert L. Lerner; Laurence A. Greenberg

[57] ABSTRACT

A television camera with a device for varying its viewing direction includes a cylindrical housing, a camera insert disposed in the housing, a camera tube with a target of a given size disposed in the camera insert, a fixed wide angle lens at least partially disposed in the housing, the lens having a beam spread angle of at least 180° and a picture field several times larger than the given size of the target, a universal mounting supporting the camera insert in the housing, and an electrically controllable positioning motor for swiveling the camera insert in each of two mutually perpendicular planes.

4 Claims, 3 Drawing Figures

TELEVISION CAMERA WITH A DEVICE FOR VARYING ITS VIEWING DIRECTION

BACKGROUND OF THE INVENTION

The invention relates to a television camera with a device for varying its viewing direction. The camera is assumed to include a cylindrical housing with a fixed lens and a camera insert containing a camera tube and, if a compact camera is involved, an electronic system as well.

In order to vary the viewing direction of such a television camera, i.e. to permit it to look in different directions, the camera has normally been mounted to a remote-controllable turning and tilting gear. Such a turning and tilting gear, however, is complicated regarding engineering and hence expensive, and since this gear is necessarily at least as large or larger than the camera, its high flow resistance has an adverse effect when being dragged under water. There are also cases where the use of a turning and tilting gear is not possible for reasons of space limitation, as when the television camera is used to examine narrow sewers in which there is no room for turning the camera to begin with.

SUMMARY OF THE INVENTION

It is accordingly an object of the invention to provide a television camera with a device for varying its viewing direction, which overcomes the hereinafore-mentioned disadvantages of the heretofore-known devices of this general type, to obviate the use of a turning and tilting gear to a large extent and to provide a television camera which can change its viewing direction (by remote control) without having to swivel the camera as a whole.

With the foregoing and other objects in view there is provided, in accordance with the invention, a television camera with a device for varying its viewing direction, comprising a cylindrical housing, a camera insert disposed in the housing, a camera or recording tube with a target or recording area of a given size disposed in the camera insert optionally along with an electronic system, a fixed wide angle lens at least partially disposed in the housing, the lens having a beam spread angle of at least 180° and a picture field or image area several times larger than the given size of the target, a universal mounting supporting the camera insert in the housing, and an electrically controllable positioning motor for swiveling the camera insert in each of two mutually perpendicular planes. When the swiveling of the camera takes place, the recording area or target of the camera or recording tube is not displaced parallel; instead, it will move on a flat arc of circle. At the least, this is not harmful; it is even favorable with respect to image sharpness or definition for the observation of a sewer, because the smaller distance from the lens to the sewer wall section recorded with the camera looking laterally requires a greater distance between the lens and the target.

In television cameras of this kind, which have a fixed lens, the focus and range adjustment is effected by sliding the camera insert forward or backward, which, for this purpose is supported for lengthwise displacement in the camera housing.

In accordance with another feature of the invention, there is provided a hollow cylinder longitudinally movable in the housing, the universal mounting being a cardan suspension mounting the camera insert in the hollow cylinder.

In accordance with an additional feature of the invention, there is provided a pull cord having two ends engaging two opposite points on the camera insert and coupling the camera insert to the positioning motor.

In accordance with a concomitant feature of the invention, the positioning motor has a shaft, and including a cord pulley disposed on the shaft, the pull cord being looped around the pulley at least once.

Other features which are considered as characteristic for the invention are set forth in the appended claims.

Although the invention is illustrated and described herein as embodied in a television camera with a device for varying its viewing direction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENT

Figure 1:
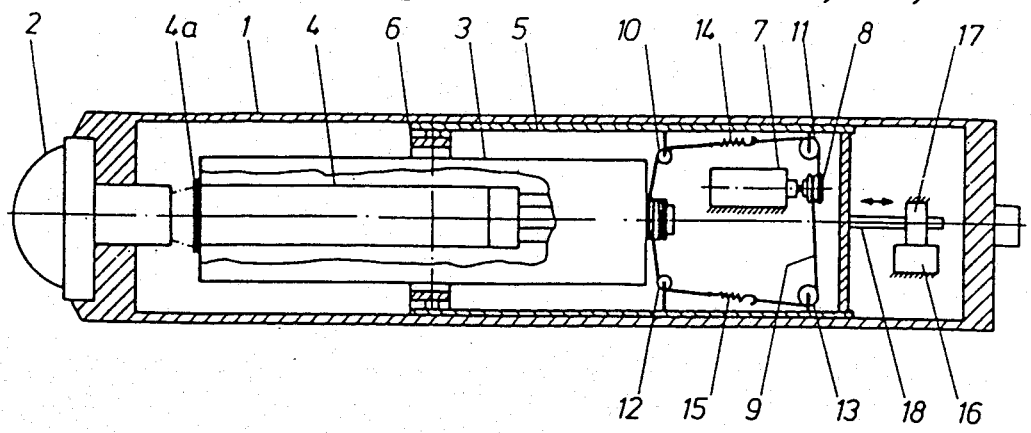
FIG. 1 is a diagrammatic longitudinal sectional view of the television camera of the invention.

Referring now to the figures of the drawings in detail and first, particularly, to FIG. 1 thereof, there is seen a camera housing 1 which has a super wide angle lens 2, simply referred to below as a lens for short, at the front end thereof, a camera insert 3, and a photo cathode or target or recording area 4a of a recording or camera tube 4 contained in the camera insert 3.

A hollow cylinder 5 is supported for longitudinal displacement in the camera housing 1. The camera insert 3 is mounted in the hollow cylinder 5 by means of a cardan or universal joint 6 for universal swiveling. The swiveling of the camera insert 3 is brought about by a positioning motor 7; the motor 7 is energized by a permanent magnet and must therefore be reversible in its running direction by pole reversal. Such a motor is known per se.

A cord pulley 8 is disposed on the shaft of the positioning motor 7. A pull cord or load cable 9 is looped around the pulley 8. The pull cord 9 is guided over guide rollers 10, 11, 12, 13 and the ends of the pull cord 9 engage the camera insert 3, so that the pull cord 9 acts as a coupling member between the positioning motor 7 and the camera insert 3. Inserted tension springs 14 and 15 keep the pull cord 9 taut.

Elements 7 to 15 together form a positioning system for swiveling in the vertical plane. A similar positioning system must be provided for the horizontal swiveling, the pull cord and its guide rollers being rotated accordingly through 90°.

The shifting of the hollow cylinder 5 for the purpose of range adjustment is brought about by a positioning motor 16, the rotation of which is transformed into a translatory movement of a spindle 18 by means of a transmission 17.

Figure 2:
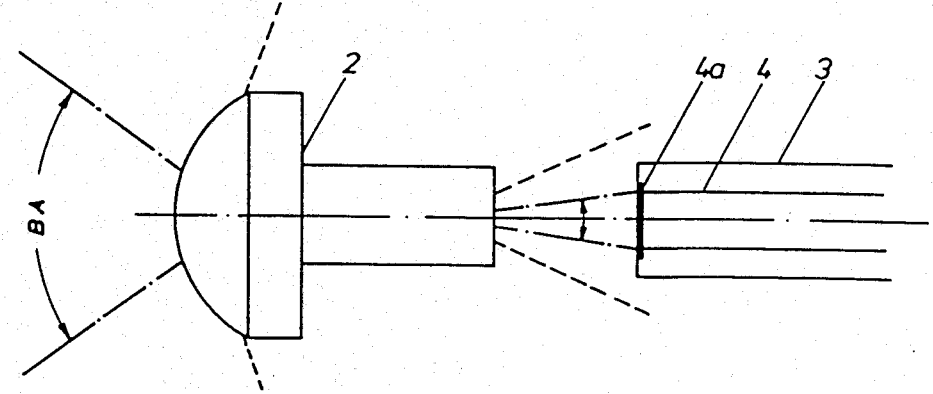
FIG. 2 is a fragmentary elevational view illustrating the optical conditions when the camera insert is in the central position.

FIG. 2 illustrates the ray path with the camera insert 3 in the central position. The broken lines at the front of the lens 2 indicate the total angle of beam spread or the generating angle of the lens 2 (in the present case 210°), while the broken lines at the back of the lens 2 show the magnitude of the diameter of the image circle or area or picture field in the plane of the recording area 4a. The dot-dash lines represent a viewing angle sector BA which corresponds to the portion of the image circle area picked up by the recording area 4a.

In the central position of the camera insert 3 shown in the drawing, the viewing angle sector BA which in the present embodiment is about 70°, is symmetrical to the center axis of the lens; the camera therefore looks straight ahead.

Figure 3:
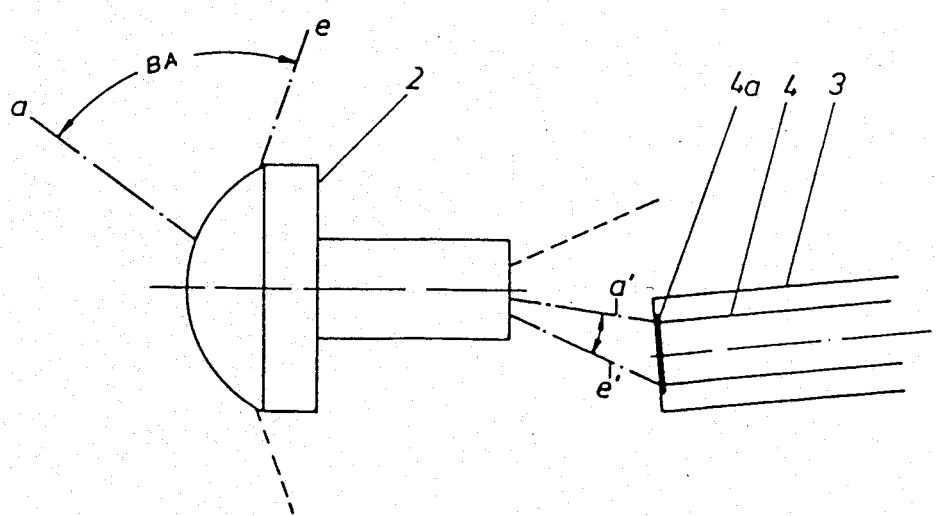
FIG. 3 is a view similar to FIG. 2 illustrating the optical conditions when the camera insert is swiveled relative to the axis of the lens.

FIG. 3 illustrates the ray path with the camera insert 3 swiveled or pivoted. In this case, the sector BA is swiveled to the limit of the viewing angle range; the camera therefore looks to the side.

Since in the embodiment example a lens is used which supplies a reversed image, a ray a' corresponds to a ray a and a ray e' corresponds to a ray e.

Due to the oblique position of the recording area 4a, its distance from the lens 2 is greater for the ray e' and smaller for the ray a' than would be the case for a parallel displacement of the recording area 4a. Thus, the beginning of the depth of focus in lateral viewing direction is moved closer to the lens 2, this being of advantage for lateral viewing of the nearby tube wall.

I claim:

1. Television camera with a device for varying its viewing direction, comprising a cylindrical housing, a camera insert disposed in said housing, a camera tube with a target of a given size disposed in said camera insert, a fixed wide angle lens at least partially disposed in said housing, said lens having a beam spread angle of at least 180° and a picture field several times larger than said given size of said target, a universal mounting supporting said camera insert in said housing, and an electrically controllable positioning motor for swiveling said camera insert in each of two mutually perpendicular planes.

2. Television camera according to claim 1, including a hollow cylinder longitudinally movable in said housing, said universal mounting being a cardan suspension supporting said camera insert in said hollow cylinder.

3. Television camera according to claim 1, including a pull cord having two ends engaging two opposite points on said camera insert and coupling said camera insert to said positioning motor.

4. Television camera according to claim 3, wherein said positioning motor has a shaft, and including a cord pulley disposed on said shaft, said pull cord being looped around said pulley at least once.

* * * * *